US009676380B2

(12) United States Patent
Andrews et al.

(10) Patent No.: US 9,676,380 B2
(45) Date of Patent: Jun. 13, 2017

(54) UNIVERSAL VENTING ARRANGEMENT FOR A RAILWAY VEHICLE BRAKE CYLINDER

(75) Inventors: Lawrence James Andrews, Cheswick, PA (US); Mark S. Krampitz, Hunker, PA (US); Gary M. Sich, Irwin, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 1398 days.

(21) Appl. No.: 12/559,694

(22) Filed: Sep. 15, 2009

(65) Prior Publication Data

US 2010/0116601 A1 May 13, 2010

Related U.S. Application Data

(60) Provisional application No. 61/097,897, filed on Sep. 18, 2008.

(51) Int. Cl.
*B60T 11/10* (2006.01)
*B23P 11/00* (2006.01)
(Continued)

(52) U.S. Cl.
CPC .......... *B60T 17/221* (2013.01); *B60T 17/004* (2013.01); *B60T 17/08* (2013.01); *F16D 65/28* (2013.01);
(Continued)

(58) Field of Classification Search
CPC ...... B60T 17/00; B60T 17/004; B60T 17/081; B60T 11/00; B60T 11/10; B60T 11/16;
(Continued)

(56) References Cited

U.S. PATENT DOCUMENTS 1,615,370 A * 1/1927 Farmer .................. B60T 17/08 137/546
1,939,845 A * 12/1933 Farmer .................. B60T 17/08 303/1
(Continued)

FOREIGN PATENT DOCUMENTS

| JP | 2002211382 A | 7/2002 |
| JP | 2004501016 A | 1/2004 |
| WO | 0168426 A1 | 9/2001 |

*Primary Examiner* — Robert A Siconolfi
*Assistant Examiner* — San Aung
(74) *Attorney, Agent, or Firm* — The Webb Law Firm

(57) ABSTRACT

The brake cylinder comprises a cylinder body comprising an annular flange and a non-pressure head. The annular flange of the cylinder body defines a plurality of openings. The non-pressure head has an annular flange and a head portion extending from the annular flange. The annular flange of the non-pressure head has a plurality of bosses and a plurality of openings corresponding to and aligned with the plurality of openings in the annular flange of the cylinder body. At least one vent is positioned in one of the plurality of bosses. The cylinder body and the non-pressure head are secured to each other at the respective flanges. The vent is positioned in the boss disposed opposite a mounting portion so that when the brake cylinder is mounted to a railway vehicle, the vent is oriented in a bottom position on the cylinder body with respect to a ground surface.

16 Claims, 5 Drawing Sheets

(51) Int. Cl.
*B60T 17/22* (2006.01)
*B60T 17/00* (2006.01)
*B60T 17/08* (2006.01)
*F16D 65/28* (2006.01)
*F16D 121/02* (2012.01)

(52) U.S. Cl.
CPC ..... *F16D 2121/02* (2013.01); *Y10T 29/49826* (2015.01)

(58) Field of Classification Search
CPC .......... B60T 13/00; B60T 13/36; B60T 13/52; B60T 13/266; B60T 13/365; B60T 13/465
USPC ..... 188/153 R, 153 D, 170, 1.11 R, 33, 235, 188/206 R, 56, 107, 197, 196 A; 92/78, 92/79, 63, 169.1; 29/428
See application file for complete search history.

(56) References Cited

U.S. PATENT DOCUMENTS

| | | | |
|---|---|---|---|
| 2,177,767 A | 10/1939 | Campbell | |
| 2,236,266 A * | 3/1941 | Hewitt | B60T 17/081 55/491 |
| 2,597,917 A | 5/1952 | Bent | |
| 3,101,219 A | 8/1963 | Herrera | |
| 3,187,642 A | 6/1965 | Cruse | |
| 3,227,053 A | 1/1966 | Spalding | |
| 3,613,515 A | 10/1971 | Swander, Jr. et al. | |
| 3,977,304 A * | 8/1976 | Meissner | B60T 17/086 188/170 |
| 5,460,076 A * | 10/1995 | Pierce | B60T 17/083 137/517 |
| 5,492,203 A | 2/1996 | Krampitz | |
| 5,560,280 A * | 10/1996 | Rumsey | B60T 17/083 29/521 |
| 5,722,311 A | 3/1998 | Pierce et al. | |
| 6,029,447 A | 2/2000 | Stojic et al. | |
| 7,303,053 B2 | 12/2007 | McCurdy, Jr. | |
| 7,306,078 B2 * | 12/2007 | Fish | B60T 17/081 188/166 |
| 2006/0060433 A1 * | 3/2006 | McCurdy, Jr. | F16D 25/088 188/153 D |

\* cited by examiner

UNIVERSAL VENTING ARRANGEMENT FOR A RAILWAY VEHICLE BRAKE CYLINDER

CROSS REFERENCE TO RELATED APPLICATION

This application claims priority to U.S. Provisional Application No. 61/097,897, filed Sep. 18, 2008.

BACKGROUND OF THE INVENTION

Field of the Invention

The disclosed invention relates to brake cylinders and, more particularly, to venting arrangements for a non-pressure head end of a brake cylinder.

Description of Related Art

Venting arrangements are typically provided on a non-pressure head of brake cylinders to permit the piston to extend without building pressure within the brake cylinder during extension or application of the cylinder. Furthermore, the vent also ensures proper release of the cylinder after extension by allowing atmospheric air to enter the non-pressure head end of the brake cylinder.

As shown in FIGS. 1-4, a known brake cylinder 10 generally includes a cylinder body 12 having an annular flange 14, a non-pressure head 20 comprising an annular flange 21, and a head portion 23 extending from the annular flange 21. Mounting feet 25 are provided on one side of the cylinder body 12 for securing the cylinder 10 to a structure, such as a freight car. A vent 22 is typically provided in the head portion 23 of the non-pressure head 20 such that the vent 22 is oriented downward to prevent drawing moisture into the brake cylinder when the cylinder 10 is released during inclement weather. Further, the brake cylinder 10 may be mounted to a freight car in any of four orientations, with the mounting feet 25 facing generally left (FIG. 1), generally up (FIG. 2), generally down (FIG. 3), and generally right (FIG. 4). Therefore, the orientation of the vent 22 with respect to the mounting feet 25 generally must be predetermined (e.g., in advance) by the end-user. Once the end-user has received the brake cylinder assembly, further modifications to the orientation of the vent 22 are unavailable and the end-user must mount the brake cylinder to the freight car or other structure in its predetermined mounting orientation.

It is known to include vent structures in a non-pressure head as disclosed by U.S. Pat. No. 1,939,845 to Farmer. This patent discloses a brake cylinder having a breather nozzle positioned on a flange portion of the non-pressure head. The breather nozzle has a passage through the nozzle having communication with the interior of a filter element and the atmosphere. In a more recent example, U.S. Pat. No. 7,303,053 to McCurdy, Jr. discloses a non-pressure head having a flange and a head portion. A portion of the flange is raised to provide a drainage duct or vent.

U.S. Pat. No. 7,306,078 to Fish discloses a composite brake cylinder having a blind end cap that may be oriented in any circular position.

U.S. Pat. No. 1,939,845 to Farmer, noted previously, and U.S. Pat. No. 1,615,370 also to Farmer, each disclose a brake cylinder in which vent structures are provided in a flange of the cylinder. In the Farmer '845 patent, a breather nozzle is in fluid communication with a non-pressure head and, in the Farmer '370 patent, a vent passage is provided in a non-pressure head adjacent a flange structure.

U.S. Pat. No. 3,101,219 to Herrara and U.S. Pat. No. 3,613,515 to Swander, Jr. disclose similar vent arrangements in which a series of vents are provided in an endwall of a piston cylinder.

U.S. Pat. No. 3,187,642 to Cruse discloses an axially-centered vent arrangement.

U.S. Pat. No. 2,177,767 to Campbell discloses an air brake cylinder with a vent with an accompanying filter disk.

Finally, U.S. Pat. No. 5,722,311 to Pierce et al. and U.S. Pat. No. 6,029,447 to Stojic et al. disclose spring brake actuators. The Stojic patent discloses an end-wall vent opening or passageway and the Pierce patent discloses the use of an elastomeric one-way vent.

SUMMARY OF THE INVENTION

One embodiment detailed herein is directed to a non-pressure head for a brake cylinder comprising an annular flange comprising a plurality of bosses and a plurality of openings, a head portion extending from the annular flange, and at least one vent positioned in one of the plurality of bosses. The annular flange may have four equally spaced bosses. The plurality of bosses may be cold-formed in the annular flange. The at least one vent may be secured in one of the plurality of bosses through an interference fit. The at least one vent may include a strainer.

Another embodiment is directed to a brake cylinder comprising a cylinder body, a non-pressure head, and at least one vent. The cylinder body comprises an annular flange with a plurality of openings. The non-pressure head comprises an annular flange and a head portion extending from the annular flange of the non-pressure head. The annular flange of the non-pressure head comprises a plurality of bosses and a plurality of openings corresponding to and aligned with the plurality of openings in the annular flange of the cylinder body. The at least one vent is desirably positioned in one of the plurality of bosses and the cylinder body and the non-pressure head are secured to each other at the respective annular flanges.

The at least one vent may be secured in one of the plurality of bosses through an interference fit. The brake cylinder may further include a mounting portion positioned on an outer surface of the cylinder body for securing the brake cylinder to a railway vehicle such as a freight car. In certain embodiments, the mounting portion includes a pair of generally parallel mounting feet. The annular flange of the non-pressure head may have four equally spaced bosses and the bosses may be cold-formed in the annular flange of the non-pressure head. The at least one vent may include a strainer.

The brake cylinder may further comprise a mounting portion positioned on an outer surface of the cylinder body for securing the brake cylinder to a railway vehicle and the at least one vent is desirably positioned in the boss disposed opposite the mounting portion so that when the brake cylinder is mounted to the railway vehicle, the at least one vent is oriented in a bottom position on the cylinder body with respect to a ground surface.

Another embodiment is directed to a method of installing a brake cylinder comprising a step of providing a brake cylinder comprising a cylinder body and a non-pressure head. The cylinder body comprises an annular flange, with the annular flange of the cylinder body defining a plurality of openings. The non-pressure head comprises an annular flange and a head portion extending from the annular flange, with the annular flange of the non-pressure head comprising a plurality of bosses and a plurality of openings. The plurality of openings in the annular flange of the non-pressure head corresponds to and is aligned with the plurality of openings in the annular flange of the cylinder body. Other method steps include securing the cylinder body and the non-pressure head together at the respective annular flanges using mechanical fasteners and positioning at least one vent in one of the plurality of bosses.

The at least one vent may be secured to one of the plurality of bosses through an interference fit. The cylinder body may further comprise a mounting portion positioned on an outer surface of the cylinder body, and the method may further comprise securing the mounting portion to a railway vehicle such that the at least one vent is oriented in a bottom position on the cylinder body with respect to a ground surface. The mounting portion may comprise a pair of mounting feet.

Further details and advantages will become clear upon reading the following detailed description in conjunction with the accompanying drawing figures.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific brake cylinder illustrated in the accompanying drawing figures and described herein is simply exemplary and should not be considered as limiting.

Figure 1:
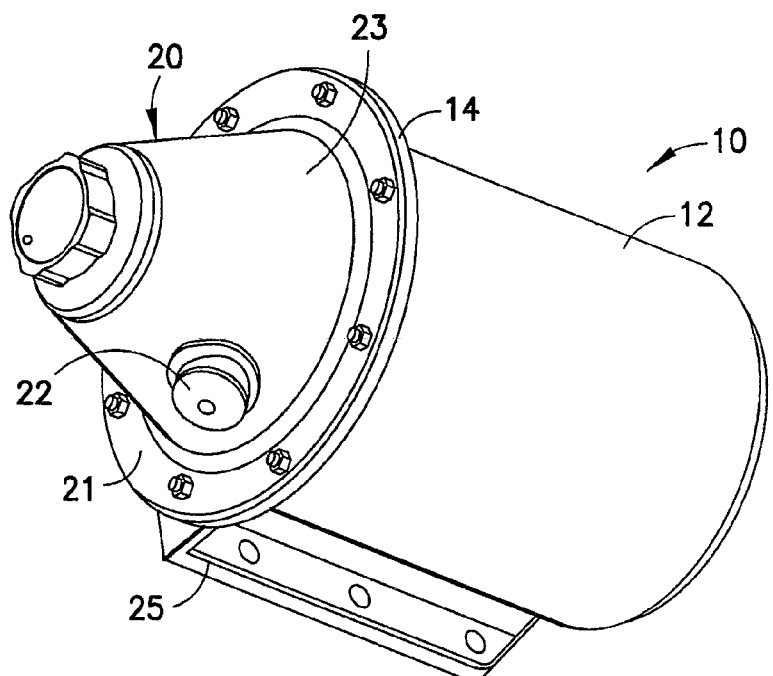
FIG. 1 is a perspective view of a known brake cylinder having a vent orientation generally facing left.
Figure 2:
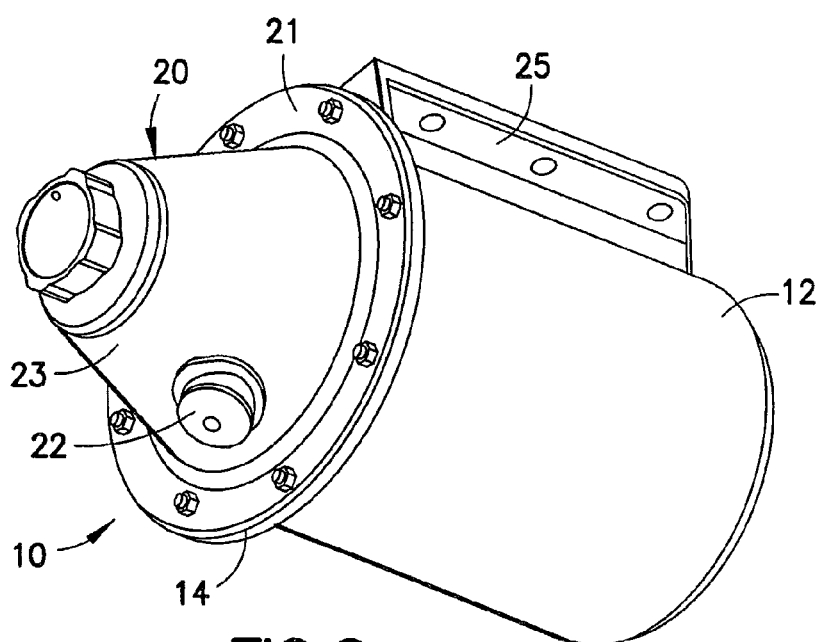
FIG. 2 is a perspective view of a known brake cylinder having a vent orientation generally facing up.
Figure 3:
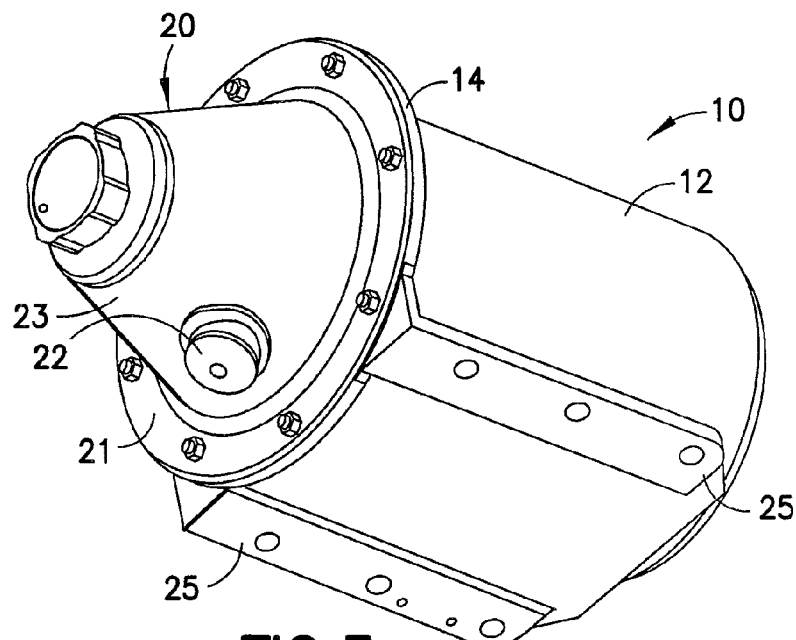
FIG. 3 is a perspective view of a known brake cylinder having a vent orientation generally facing down.
Figure 4:
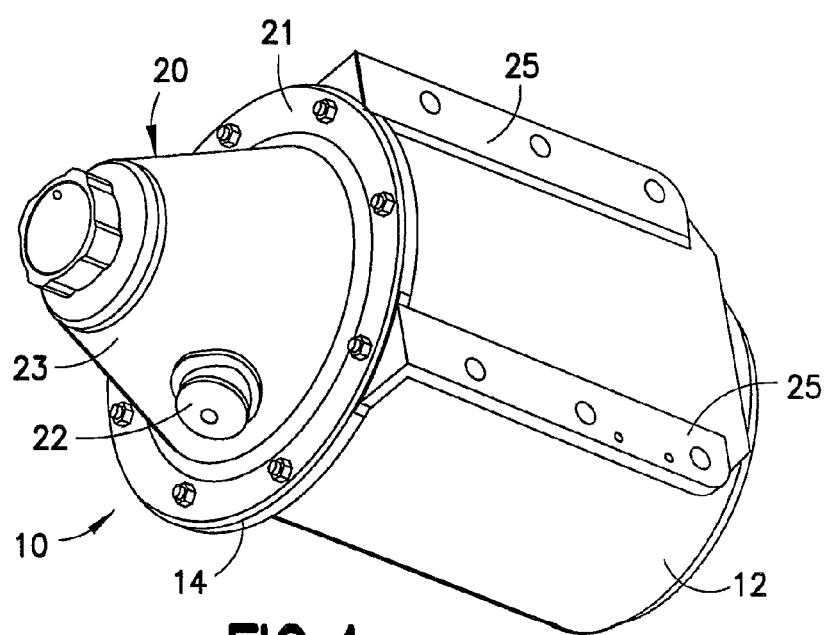
FIG. 4 is a perspective view of a known brake cylinder having a vent orientation generally facing right.
Figure 5:
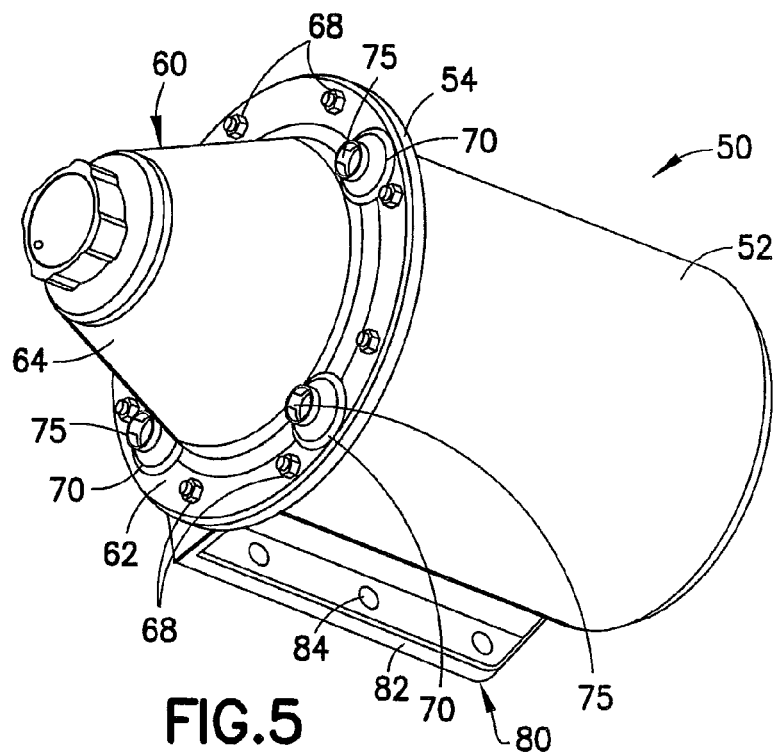
FIG. 5 is a perspective view of a brake cylinder according to one embodiment showing mounting feet generally facing left.
Figure 6:
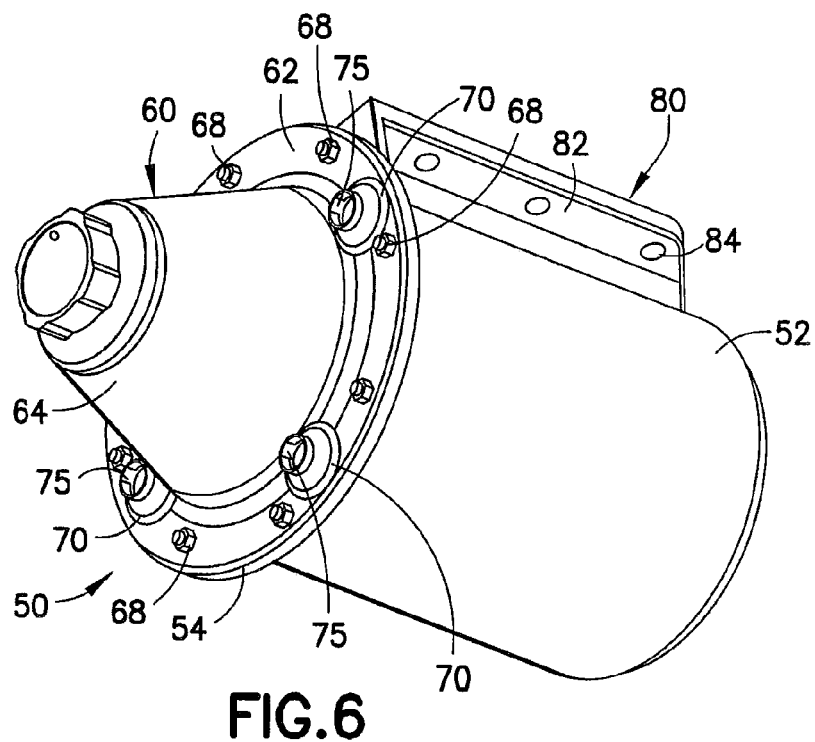
FIG. 6 is a perspective view of the brake cylinder shown in FIG. 5 showing mounting feet generally facing up.
Figure 7:
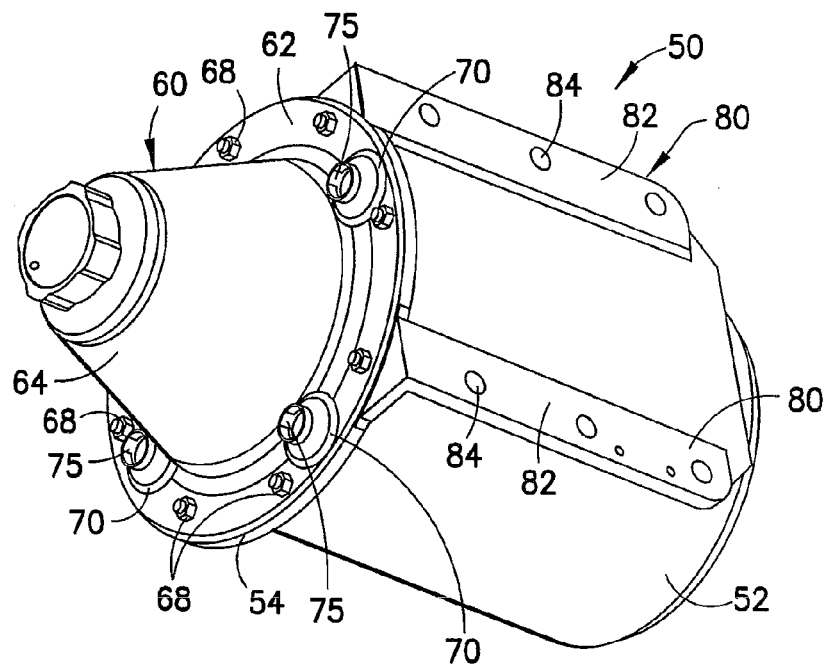
FIG. 7 is a perspective view of the brake cylinder shown in FIG. 5 showing mounting feet generally facing right.
Figure 8:
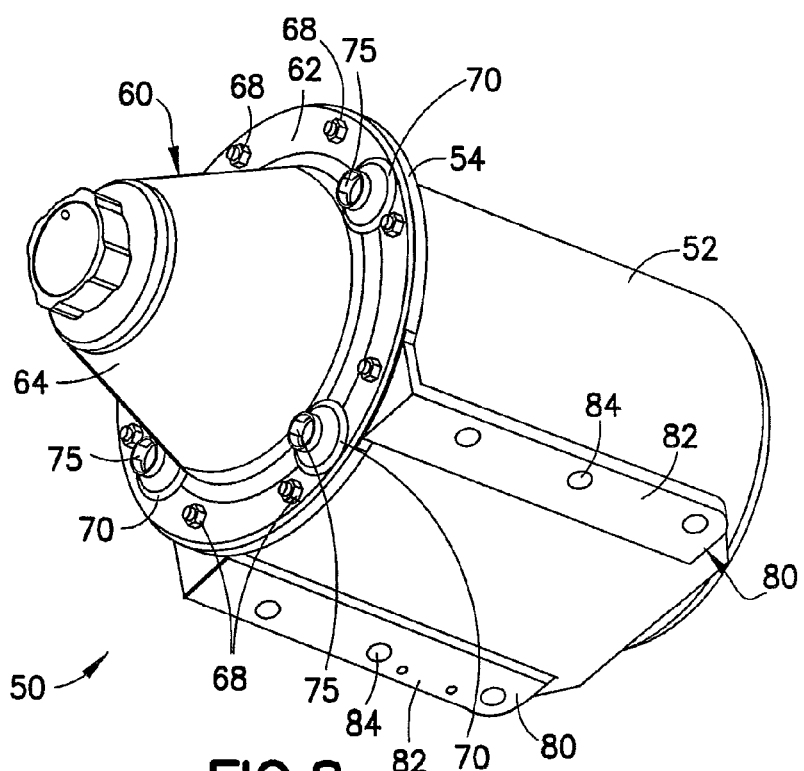
FIG. 8 is a perspective view of the brake cylinder shown in FIG. 5 showing mounting feet generally facing down.
Figure 9:
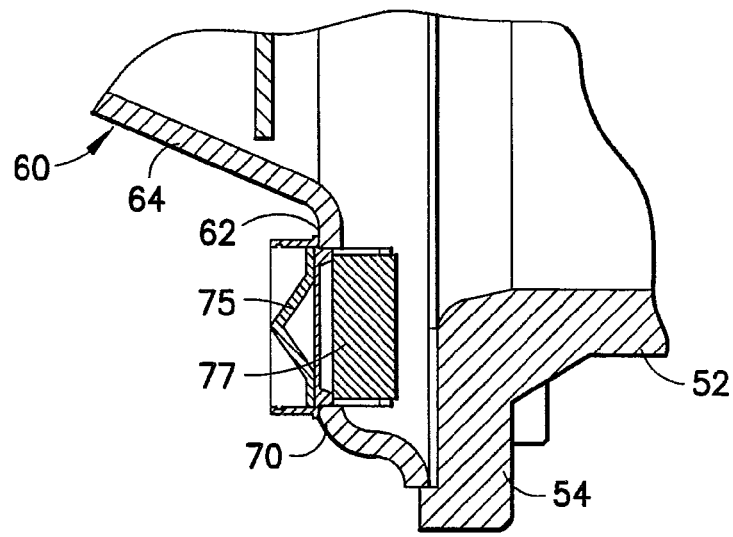
FIG. 9 is a partial cross-sectional view of the brake cylinder shown in FIG. 5.
Figure 10:
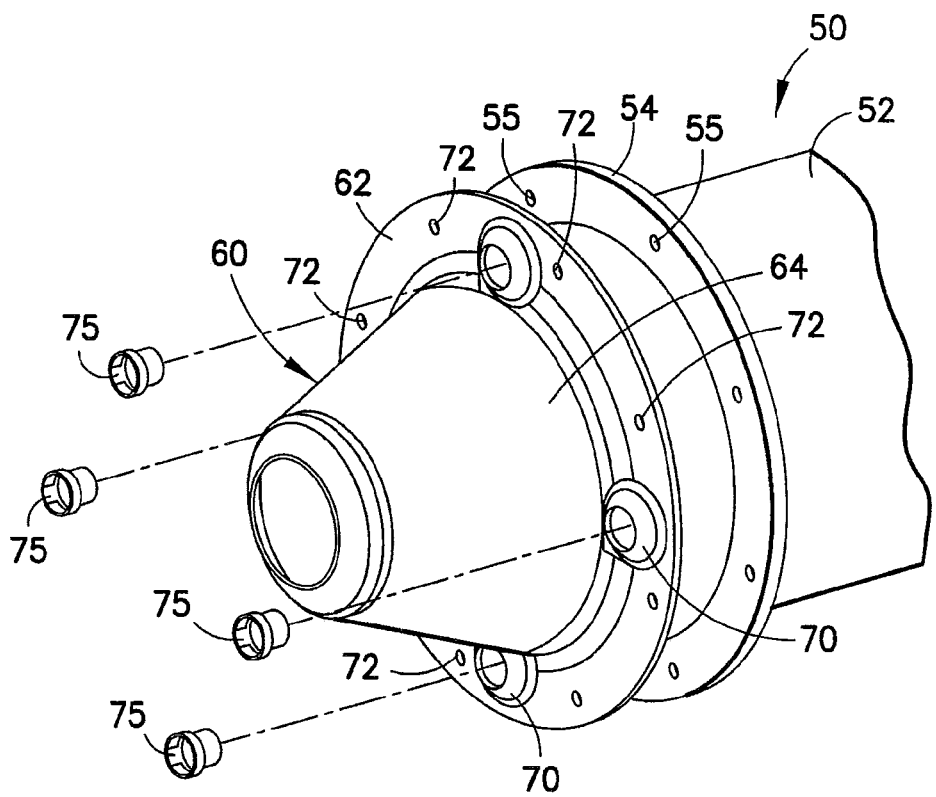
FIG. 10 is a partial exploded perspective view of the brake cylinder shown in FIG. 5.

In one embodiment shown in FIGS. 5-10, a brake cylinder 50 includes a cylinder body 52, a non-pressure head 60, and at least one vent 75. The cylinder body 52 has an annular flange 54 with a plurality of through openings or holes 55. The non-pressure head 60 has an annular flange 62 and a head portion 64 extending from the annular flange 62. The annular flange 62 of the non-pressure head 60 has a plurality of bosses 70 and a plurality of through holes 72. The plurality of through holes 72 correspond to and are aligned with the plurality of through holes in the annular flange 54 of the cylinder body 52. Accordingly, the cylinder body 52 and the non-pressure head 60 may be joined by mating the respective annular flanges 54, 62 of the body 52 and the non-pressure head 60. The annular flanges 54, 62 may then be secured to one another via the through holes using mechanical fasteners 68 and (bolt and nut combinations as an example). The non-pressure head 60 and the cylinder body 52, however, may be secured to one another by any suitable mechanical arrangement.

The brake cylinder 50 further includes at least one vent 75 positioned in one of the plurality of bosses 70 in the annular flange 62. As shown in FIGS. 5-10, the brake cylinder 50 desirably includes four bosses 70 equally spaced around the perimeter of the annular flange 62 of the non-pressure head 60 with four vents 75 positioned therein. The vents 75 may be secured to the bosses through an interference fit or any other suitable mechanical arrangement. The plurality of bosses 70 may be formed in the annular flange 62 through a cold-forming process or any other suitable method. Furthermore, as shown more clearly in FIG. 9, the vent 75 may include a strainer 77 to prevent dirt and other debris from entering the non-pressure head 60 of the cylinder 50 through the vent 75. Referring to FIGS. 5-8, the cylinder body 52 may include a mounting portion 80 for mounting the brake cylinder 50 to a structure, such as a freight car. As shown in FIGS. 5-8, the mounting portion 80 may be a pair of mounting feet 82 defining a plurality of openings 84 for receiving mechanical fasteners and the like. Accordingly, the brake cylinder 50 may be mounted to a railway vehicle such as a freight car (not shown) via the mounting portion 80 with at least one vent 75 oriented in a bottom or lower most position on the cylinder body 52 and non-pressure head 60 with respect to a ground surface. Thus, any moisture that accumulates in the bottom of the cylinder 50 can be expelled via the at least one vent 75.

The brake cylinder 50 standardizes brake cylinder design by allowing the cylinder 50 to be mounted to a freight car with a number of orientations (FIGS. 5-8). Thus, the brake cylinder 50 eliminates customized manufacturing and assembly and provides the end-user with the flexibility of acquiring a single brake cylinder design and determining the desired mounting orientation at the time of installation. Furthermore, the vents 75 and their orientation on the non-pressure head 60 are arranged to prohibit drawing moisture into the brake cylinder 50 during a brake release in inclement weather as well as to permit expulsion of any moisture from the brake cylinder 50 that may accumulate due to either seepage past the felt wiper or condensation within the cylinder 50 due to environmental conditions.

While embodiments of a universal venting arrangement for a railway vehicle brake cylinder were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A brake cylinder, comprising:
a cylinder body comprising an annular flange, the cylinder body including a mounting portion positioned on an outer surface of the cylinder body for securing the brake cylinder to a railway vehicle, the mounting portion having at least first and second mounting orientations, the first orientation of the mounting portion being rotated relative to the second orientation of the mounting portion;

a non-pressure head comprising an annular flange and a head portion extending from the annular flange, the annular flange of the non-pressure head comprising a plurality of bosses, the plurality of bosses are equally spaced relative to each other and define a plurality of openings; and at least one vent positioned in one of the plurality of openings of the plurality of bosses, wherein the cylinder body and the non-pressure head are secured to each other at the respective annular flanges, and wherein the plurality of openings comprises at least first and second openings, the first opening oriented in a generally bottom position on the cylinder body with respect to a ground surface when the mounting portion has the first mounting orientation, the second opening oriented in a generally bottom position on the cylinder body with respect to a ground surface when the mounting portion has the second mounting orientation.

2. A brake cylinder as claimed in claim 1, wherein the at least one vent is secured in one of the plurality of bosses through an interference fit.

3. A brake cylinder as claimed in claim 1, wherein the mounting portion comprises a pair of generally parallel mounting feet.

4. A brake cylinder as claimed in claim 1, wherein the annular flange of the non-pressure head has four equally spaced bosses.

5. A brake cylinder as claimed in claim 4, wherein the plurality of bosses is cold-forming in the annular flange of the non-pressure head.

6. A brake cylinder as claimed in claim 5, wherein the at least one vent is secured in one of the plurality of bosses through an interference fit.

7. A brake cylinder as claimed in claim 6, wherein the at least one vent includes a strainer.

8. A method of installing a brake cylinder on a railway vehicle, comprising the steps of:
    providing a brake cylinder comprising:
        a cylinder body comprising an annular flange, the cylinder body including a mounting portion positioned on an outer surface of the cylinder body for securing the brake cylinder to a railway vehicle; and
        a non-pressure head comprising an annular flange and a head portion extending from the annular flange, the annular flange of the non-pressure head comprising a plurality of bosses, the plurality of bosses are equally spaced relative to each other and define a plurality of openings;
    securing the cylinder body and the non-pressure head together at the respective annular flanges using mechanical fasteners;
    positioning at least one vent in one of the plurality of openings of the plurality of bosses;
    securing the mounting portion to a railway vehicle such that at least one of the plurality of bosses is oriented in a bottom position of the cylinder body with respect to a ground surface, wherein the mounting portion has at least first and second mounting orientations, the first orientation of the mounting portion being rotated relative to the second orientation of the mounting portion.

9. A method as claimed in claim 8, wherein the at least one vent is secured in one of the plurality of bosses through an interference fit.

10. A method as claimed in claim 8, wherein the mounting portion comprises a pair of mounting feet.

11. A brake cylinder, comprising:
    a cylinder body comprising an annular flange, the cylinder body including a mounting portion positioned on an outer surface of the cylinder body for securing the brake cylinder to a railway vehicle;
    a non-pressure head comprising an annular flange and a head portion extending from the annular flange, the cylinder body and the non-pressure head are secured to each other at the respective annular flanges, the annular flange of the non-pressure head defining a plurality of openings, each of the plurality of openings are configured to receive a vent and a strainer,
    wherein the mounting portion of the cylinder body has at least first and second mounting orientations, the first orientation of the mounting portion being rotated relative to the second orientation of the mounting portion, wherein the plurality of openings comprises at least first and second openings, the first opening oriented in a generally bottom position on the cylinder body with respect to a ground surface when the mounting portion has the first mounting orientation, the second opening oriented in a generally bottom position on the cylinder body with respect to a ground surface when the mounting portion has the second mounting orientation, and wherein at least one of the plurality of openings is configured to expel fluid from a bottom of the cylinder body for each of the plurality of mounting orientations.

12. A brake cylinder as claimed in claim 11, further comprising a plurality of bosses surrounding each of the plurality of openings.

13. A brake cylinder as claimed in claim 11, wherein the plurality of openings are equally spaced relative to each other.

14. A brake cylinder as claimed in claim 11, further comprising at least one vent positioned in one of the plurality of openings.

15. A brake cylinder as claimed in claim 11, wherein the mounting portion comprises a pair of generally parallel mounting feet.

16. A brake cylinder as claimed in claim 11, wherein the annular flange of the non-pressure head has four equally spaced openings.

* * * * *

UNITED STATES PATENT AND TRADEMARK OFFICE
CERTIFICATE OF CORRECTION

PATENT NO. : 9,676,380 B2  
APPLICATION NO. : 12/559694  
DATED : June 13, 2017  
INVENTOR(S) : Lawrence J. Andrews et al.

It is certified that error appears in the above-identified patent and that said Letters Patent is hereby corrected as shown below:

In the Claims

Column 5, Line 33, Claim 5, delete "cold-forming" and insert -- cold-formed --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*